3,408,391
1-BENZOCYCLOBUTENYL AMINO ACIDS
Joseph A. Skorcz, Milwaukee, Wis., assignor to Colgate-Palmolive Company, New York, N.Y., a corporation of Delaware
No Drawing. Filed Apr. 19, 1965, Ser. No. 449,285
5 Claims. (Cl. 260—518)

ABSTRACT OF THE DISCLOSURE

The compounds are 1-benzocyclobutenyl amino acids useful as central nervous system depressants. Among the compounds disclosed are 1-benzocyclobutenylglycine and β-(1-benzocyclobutenyl)-alanine.

---

The present invention relates to novel benzocyclobutenes. More particularly, this invention is concerned with novel 1-benzocyclobutenyl amino acids, novel intermediates associated with the preparation of these compounds, processes of producing the intermediates and the final compounds and the pharmacologic and therapeutic uses for such compounds.

The novel 1-benzocyclobutenyl amino acids of the present invention have the formula

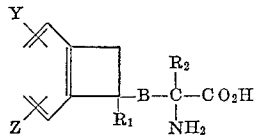

in which Y and Z represent hydrogen, lower alkoxy such as methoxy, ethoxy and propoxy, lower thioalkyl such as thiomethyl and thioethyl, methylenedioxy and trifluoromethyl; $R_1$ represents hydrogen, a lower alkyl such as methyl, ethyl and propyl, an aralkyl such as a phenyl-lower alkyl including benzyl and phenethyl, a cycloalkyl having 3 to 7 carbons in the ring including cyclopropyl, cyclopentyl and cyclohexyl, cycloalkyl-lower alkyl groups such as cyclopentylmethyl, cyclohexylethyl and other such groups in which the cycloalkyl has 3 to 7 carbons in the ring; $R_2$ is hydrogen or a lower alkyl such as methyl, ethyl and propyl; and B is a single chemical bond or a lower alkylene having up to 4 carbons in a chain such as methylene, ethylene, isopropylene and butylene.

The compounds of the present invention in which B is a chemical bond may be prepared by treating 1-bromobenzocyclobutene with an alkyl acetamidocyanoacetate to form the alkyl 1-benzocyclobutenylacetamidocyanoacetate which upon hydrolysis yields the corresponding 1-benzocyclobutenyl amino acid. This process may be illustrated by the following diagram which relates to the preparation of 1-benzocyclobutenylglycine:

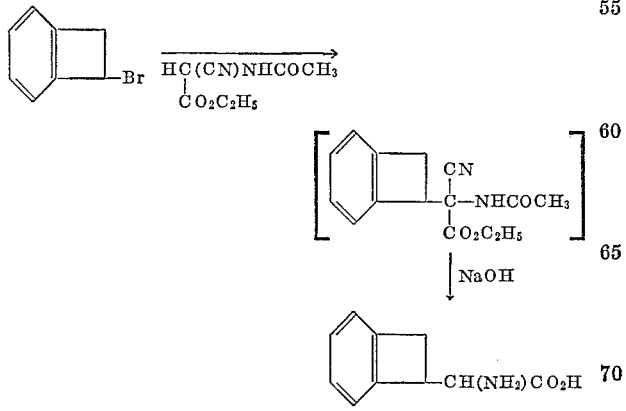

The 1-bromobenzocyclobutene and its ring substituted derivatives which may be employed as starting materials may be prepared from benzocyclobutene and its ring substituted derivatives in the manner described by Cava and Napier, J. Am. Chem. Soc., volume 80, page 2255 (1958).

The compounds may also be prepared by reacting a benzocyclobutene-1-carboxylic acid with bromine in the presence of a red mercuric oxide catalyst in the manner described in Example 1.

Representative of the 1-bromobenzocyclobutenes which may be employed in the process are the following:

1-bromobenzocyclobutene,
1-bromo-4-methoxybenzocyclobutene, and
1-bromo-5-trifluoromethylbenzocyclobutene.

The reaction between the 1-bromobenzocyclobutene and the alkyl acetamidocyanoacetate is conveniently effected by bringing the reactants together in the presence of sodium in absolute ethanol. After the reactants have been brought into contact the reaction may be promoted by heating at reflux temperatures for periods up to and exceeding 40 hours or more. When the reaction is substantially complete the mixture is cooled and filtered. The filtrate is evaporated to near dryness and the residue is diluted with water. The organic layer which separates is taken up in ethyl acetate, washed with saturated brine and dried over anhydrous sodium sulfate. The ethyl acetate is then evaporated to yield the alkyl 1-benzocyclobutenylacetamidocyanoacetate. That compound may then be purified by elution chromatography and subjected to alkali hydrolysis to yield the 1-benzocyclobutenyl amino acid.

Examples of some of the 1-benzocyclobutenyl amino acids which may be prepared by the process described above are the following:

1-benzocyclobutenylglycine,
4-methoxybenzocyclobuten-1-yl glycine, and
5-trifluoromethylbenzocyclobuten-1-yl glycine.

The compounds of the invention in which B is alkylene are preferably prepared by treating a corresponding sulfonate, such as the tosylate, with an acetamidocyanoacetate in the presence of sodium ethoxide and ethanol to form an intermediate which upon hydrolysis yields the corresponding amino acid. This reaction can be represented as follows:

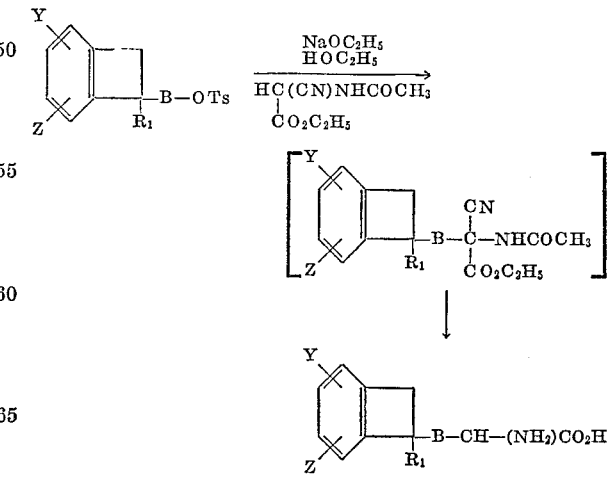

in which Ts is tosyl or an equivalent sulfonyl group, B is alkylene, and the other symbols have their assigned values.

The tosylate employed in the above reaction may be prepared by hydrolyzing a benzocyclobutenyl nitrile to the corresponding carboxylic acid, reducing the acid to the alcohol and converting the alcohol to a tosylate. This reaction can be illustrated by the following diagram which relates to the preparation of 1-hydroxymethyl-benzocyclobutene tosylate.

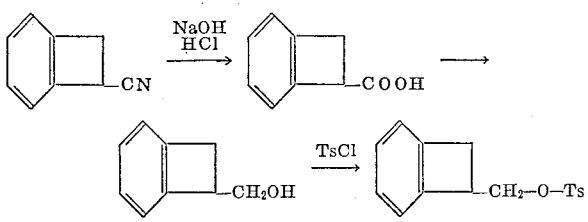

The first step of the process in which the nitrile group is hydrolyzed to a carboxylic acid group can be readily effected by reacting the nitrile with an inorganic base, such as an alkali metal hydroxide, to convert the nitrile group to a carboxylic acid salt which can then be treated with acid to form the free carboxyl group.

Some of the benzocyclobutenyl carboxylic acids which can be produced as described are:
Benzocyclobutene-1-carboxylic acid,
1-(carboxymethyl)-benzocyclobutene,
1-(2-carboxyethyl)-1-methylbenzocyclobutene,
1-(carboxymethyl)-4-methoxybenzocyclobutene, and
1-(carboxymethyl)-5-trifluoromethylbenzocyclobutene.

Reduction of the carboxyl group of the hydroxymethyl group is readily effected with lithium aluminum hydride in an anhydrous liquid reaction medium such as ether or tetrahydrofuran. The intermediate complex alcoholate which forms will upon hydrolysis with acid yield the free alcohol.

Some of the benzocyclobutenyl alcohols which can be produced as described are:
1-hydroxymethylbenzocyclobutene,
1-(2-hydroxyethyl)-benzocyclobutene,
1-hydroxymethyl-1-benzylbenzocyclobutene, and
1-hydroxymethyl-5-trifluoromethylbenzocyclobutene.

The benzocyclobutenyl alcohols can be readily converted to sulfonates by reacting the alcohol with a sulfonyl halide under basic conditions. Ethanesulfonyl chloride and p-toluenesulfonyl chloride illustrate the sulfonyl halides which can be used. Pyridine is preferred as the basic reaction medium. The reaction proceeds at ambient temperatures although lower temperatures are suitable.

Representative of the sulfonates which may be produced by the process are the following:
1-hydroxymethylbenzocyclobutene tosylate,
1-(2-hydroxyethyl)-benzocyclobutene tosylate,
1-hydroxymethyl - 1-benzylbenzocyclobutene tosylate, and
1-hydroxymethyl - 5-trifluoromethylbenzocyclobutene tosylate.

By reacting a benzocyclobutenylsulfonate, produced as described, with an acetamidocyanoacetate, an intermediate is formed which may be readily hydrolyzed to form the amino acid in which B is lower alkylene.

Representative of the amino acids which may be produced by the process are the following:
β-(1-benzocyclobutenyl)-alanine,
β-(4-methoxybenzocyclobuten-1-yl)-alanine, and
β-(5-trifluorobenzocyclobuten-1-yl)alanine.

The compounds of the invention in which $R_2$ is lower alkyl may be prepared by treating a benzocyclobutenyl nitrile with a suitable Grignard reagent to form a ketimine salt which upon hydrolysis yields the ketone which may be treated with an alkali cyanide and ammonium chloride to form the amino acid. This reaction may be represented as follows:

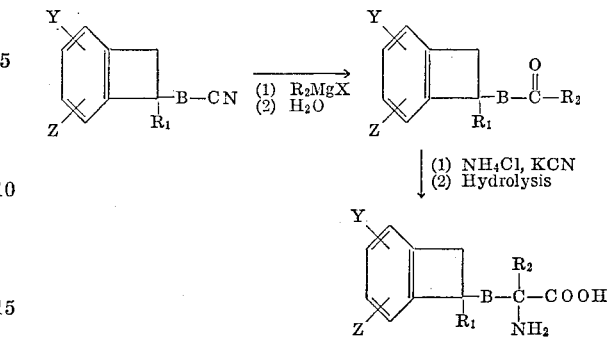

Some of the Grignard reagents which can be used are methylmagnesium bromide, ethylmagnesium chloride, methylmagnesium iodide, butylmagnesium bromide, phenylmagnesium iodide, benzylmagnesium chloride, cyclopropylmagnesium bromide, cyclohexylmagnesium bromide and cyclohexylmethylmagnesium bromide.

The Grignard reaction is readily effected employing conventional conditions of solvent, temperature and the like. The complex ketimine salt is readily hydrolyzed by adding a weak acid to the resulting reaction mixture. The product can be isolated and purified by standard procedures.

Some of the ketones which may be formed in this way are:
1-benzocyclobutenyl ethyl ketone,
1-benzocyclobutenyl methyl ketone,
5-trifluoromethylbenzocyclobuten-1-yl ethyl ketone,
1-benzocyclobutenyl phenyl ketone,
1-benzocyclobutenyl butyl ketone,
1-benzocyclobutenyl cyclopropyl ketone,
1-benzocyclobutenyl cyclohexyl ketone,
1-benzyl-1-benzocyclobutenyl methyl ketone, and
1-cyclohexyl-1-benzocyclobutenyl butyl ketone.

The ketones may be treated with ammonium chloride and an alkali metal cyanide under the conditions of a Strecker synthesis to form the amino acids. Strecker, Ann. 75, 27 (1850). N. Zelinsky and G. Stadnikoff, Ber. 39, 1722 (1906).

Representative of the amino acids which may be prepared in this manner are the following:
α-(1-benzocyclobutenyl)-alanine,
α-(4-methoxybenzocyclobuten-1-yl)-alanine, and
Phenyl(1-benzocyclobutenyl)glycine.

The benzocyclobutene nitriles employed in the described processes may be prepared in the manner described in literature. Cava and Napier, J. Am. Chem. Soc., volume 80, page 2257 (1958).

The compounds of the invention, since they possess both amino and carboxylic acid groups will form a wide variety of salts. The compound and those salts which are non-toxic and pharmaceutically acceptable are central nervous system depressants, antihypertensives, and serotonin antagonists.

The compounds can be administered to animals as pure compounds, or in the form of pharmaceutically acceptable salts. However, to obtain a more practical size to dosage relationship, one or more of the compounds is generally combined with a suitable pharmaceutical carrier and made into unit dosage forms. These dosage forms may be made for either oral or parenteral administration.

Pharmaceutical carriers which are either liquid or solid may be employed. The preferred liquid carrier is water. However, in the event the compound is not soluble or miscible in water, an organic solvent such as ethylene glycol may be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin and disintegrating agents such as sodium carbonate in combination with citric acid may be employed in the formation of the tablets.

Unit dosage forms, such as tablets and capsules, may contain any suitable predetermined amount of one or more of the active ingredients as a non-toxic salt and may be administered one or more at a time at regular intervals. Such unit dosage forms, however, should generally contain a concentration of 0.1% to 10% by weight of one or more of the active agents. Such unit dosage forms should advisably contain about 5 to 150 mg. of the active ingredients.

The following examples are presented to illustrate this invention:

EXAMPLE 1.—ETHYL 1-BENZOCYCLOBUTENYL-ACETAMIDOCYANOACETATE

To a stirred, refluxing solution of bromine (0.1 mole) in 150 ml. of carbon tetrachloride is added in portions a suspension of red mercuric oxide (0.07 mole) and benzocyclobutene-1-carboxylic acid (0.1 mole) in 400 ml. of carbon tetrachloride over a 2.5 hour period. The mixture is heated for an additional 2 hours, cooled, and filtered. The filtrate is concentrated to approximately 75 ml., extracted with 5% aqueous sodium hydroxide, dried, and then poured through 25 g. of alumina in sintered glass funnel. The alumina is washed with an additional 200 ml. of n-hexane, which is combined with the original filtrate and evaporated. The residual liquid is distilled to afford 1-bromobenzocyclobutene, B.P. 91–93° at 10 mm.

To a solution of sodium (0.075 g.-atm.) in 100 ml. of absolute ethanol under nitrogen is added ethyl acetamidocyanoacetate (0.075 mole). The pale yellow solution is stirred for 30 minutes, and then is treated with 1-bromobenzocyclobutene (0.075 mole). The darkened reaction mixture is refluxed for 40 hours, cooled, and filtered. The filtrate is evaporated to near dryness, and the residue is diluted with water. The organic layer is taken up in 150 ml. of ethyl acetate, washed with saturated brine and dried over anhydrous sodium sulfate. (The odor of hydrogen cyanide is evident during the extraction procedure.) Solvent evaporation yields a viscous, brown oil which is put on a column of 450 g. of alumina. Elution with benzene-ether (3:1) gives a colorless liquid resembling diethyl carbonate in spectral behavior. Chloroform first elutes a gum with only a trace of nitrile absorption in the infrared, then ethyl 1-benzocyclobutenylacetamidocyanoacetate as a viscous oil.

EXAMPLE 2.—1-BENZOCYCLOBUTENYLGLYCINE

A 9 g. sample of the partially purified ethyl 1-benzocyclobutenylacetamidocyanoacetate is refluxed in a solution of methanol (75 ml.) and 10% sodium hydroxide (75 ml.) for 2 days. The amber solution is concentrated under vacuum, diluted with water, and extracted with ethyl acetate. Neutralization with 4 N hydrochloric acid causes the immediate precipitation of a pale tan, flocculent solid. Recrystallization is effected by the addition of 500 ml. of ethanol to a cold, aqueous (450 ml.) solution of the material. The 1-benzocyclobutenylglycine obtained has a melting point of 260–261.5°.

EXAMPLE 3.—β-(1-BENZOCYCLOBUTENYL)-ALANINE

Benzocyclobutene-1-carboxylic acid, previously prepared by hydrolysis of the corresponding nitrile, is dissolved in anhydrous tetrahydrofuran and reduced in the presence of lithium aluminum hydride, under standard reduction conditions, to form the 1-hydroxymethylbenzocyclobutene.

The 1-hydroxymethylbenzocyclobutene is reacted with p-toluenesulfonyl chloride at room temperature in the presence of pyridine to form the corresponding tosylate. The tosylate is reacted with ethylacetamidocyanoacetate to form an intermediate which upon treatment with sodium hydroxide hydrolyzes to form β-(1-benzocyclobutenyl)-alanine.

I claim:

1. A compound of the formula

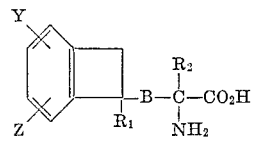

in which Y and Z are members selected from the group consisting of hydrogen, lower alkoxy, and trifluoromethyl; $R_1$ is selected from the group consisting of hydrogen and lower alkyl; $R_2$ is selected from the group consisting of hydrogen and lower alkyl and B is selected from the group consisting of a single bond and a lower alkylene.

2. 1-benzocyclobutenylglycine.
3. β-(1-benzocyclobutenyl)-alanine.
4. β-(4-methoxybenzocyclobuten-1-yl)-alanine.
5. β-(5-trifluoromethylbenzocyclobuten-1-yl)-alanine.

References Cited

UNITED STATES PATENTS 2,358,768  9/1944  Wallingford et al. __ 260—465.4
3,149,159  9/1964  Kaiser et al. _____ 260—570.8

OTHER REFERENCES

Berichte, 41, 2061 (1908).
Greenstein et al.: Chem. of the Amino Acids, vol. 1, 1961, pages 711–712.
Migrdichian, Org. Synthesis, vol. 1, 1957, page 283.
Royals, Adv. Org. Chem., 1954, pages 742–743.

LORRAINE A. WEINBERGER, *Primary Examiner.*

V. GARNER, *Assistant Examiner.*